4 Sheets—Sheet 1.

F. W. G. BOETTCHER.
Combined Lathe and Planer.

No. 229,800. Patented July 13, 1880.

Witnesses:
E. G. Asmus.
Chas. T. Hunter.

Inventor:
F. W. Gustav Boettcher
By Jas. B. Erwin
Attorney

N. PETERS, PHOTO-LITHOGRAPHER, WASHINGTON, D. C.

F. W. G. BOETTCHER.
Combined Lathe and Planer.

No. 229,800. Patented July 13, 1880.

F. W. G. BOETTCHER.
Combined Lathe and Planer.

No. 229,800. Patented July 13, 1880.

Witnesses:
Inventor:

F. W. G. BOETTCHER.
Combined Lathe and Planer.

No. 229,800.   Patented July 13, 1880.

United States Patent Office.

F. W. GUSTAV BOETTCHER, OF WATERTOWN, WISCONSIN.

COMBINED LATHE AND PLANER.

SPECIFICATION forming part of Letters Patent No. 229,800, dated July 13, 1880.

Application filed December 22, 1879.

*To all whom it may concern:*

Be it known that I, F. W. GUSTAV BOETTCHER, of the city of Watertown, in the county of Jefferson, State of Wisconsin, in the United States, have invented a certain new and useful Improvement in Wood-Working Machinery; and I do hereby declare that the following is a full, clear, and exact description of the invention, which will enable others skilled in the art to which it appertains to make and use the same.

Figure 1:
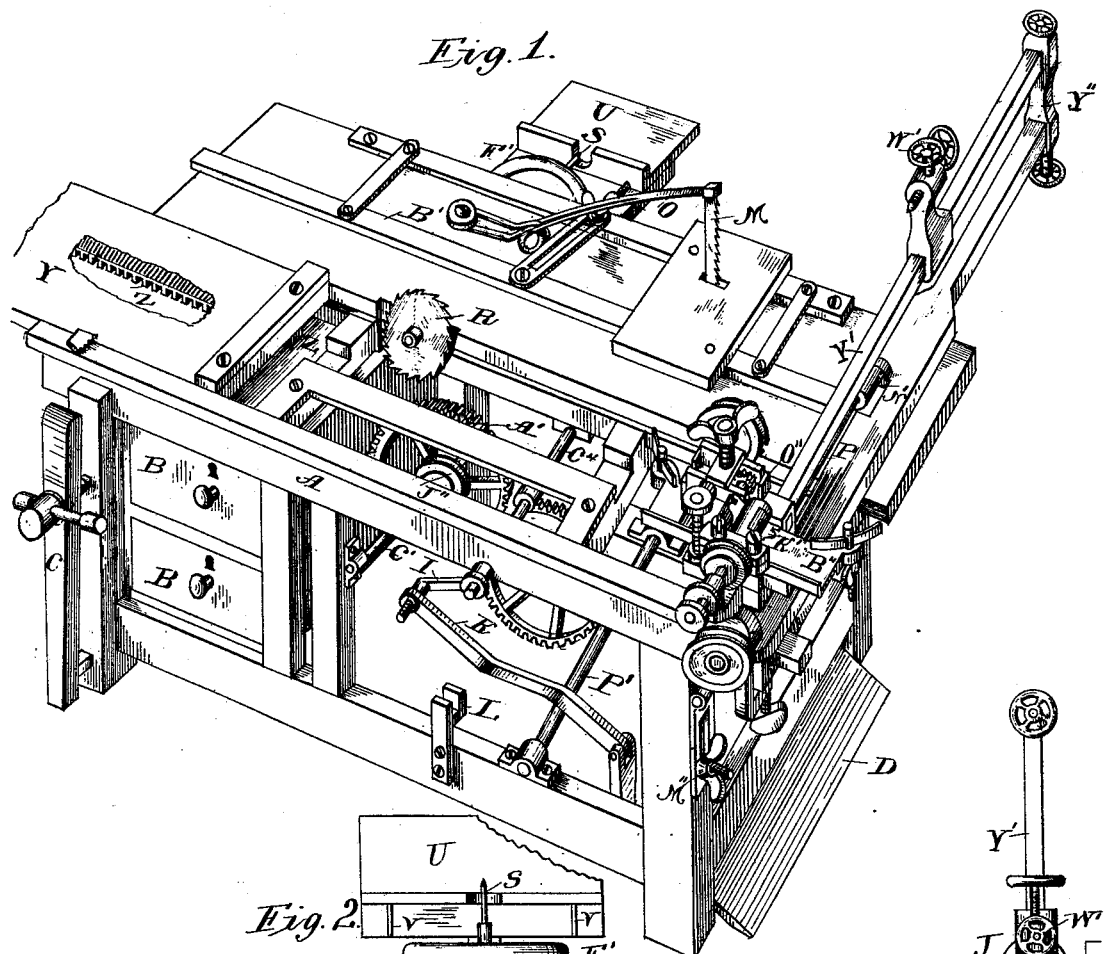
Figure 2:
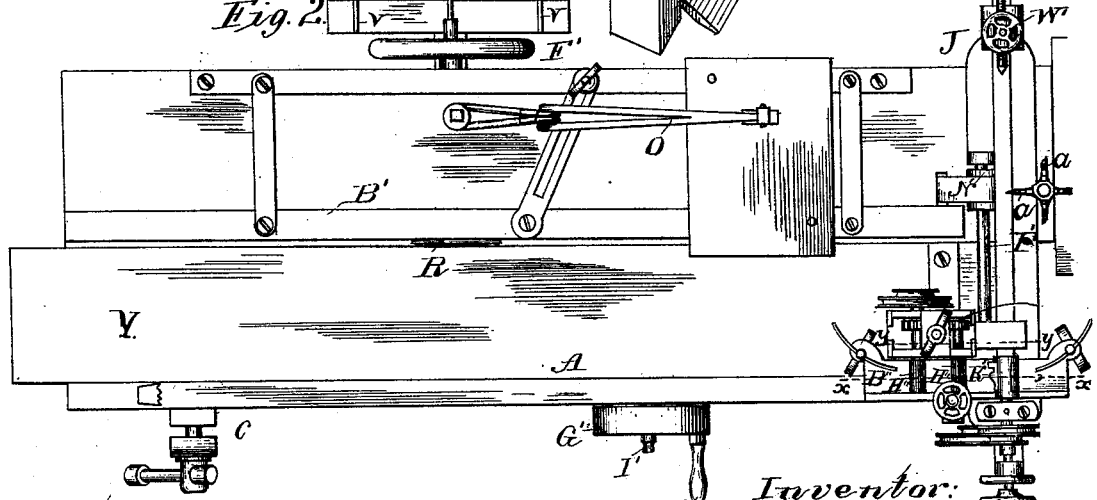
Figure 3:
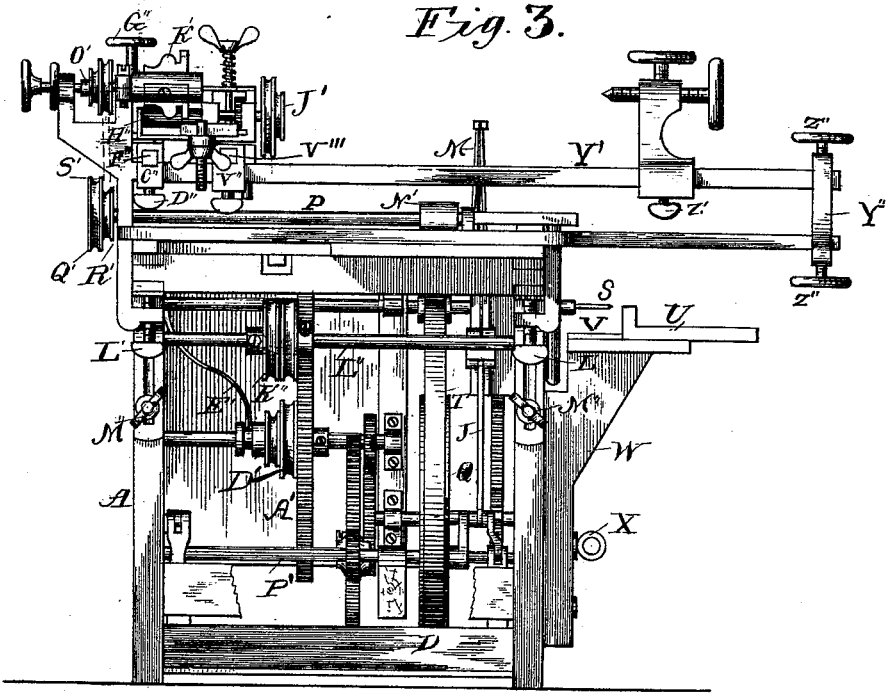
Figure 4:
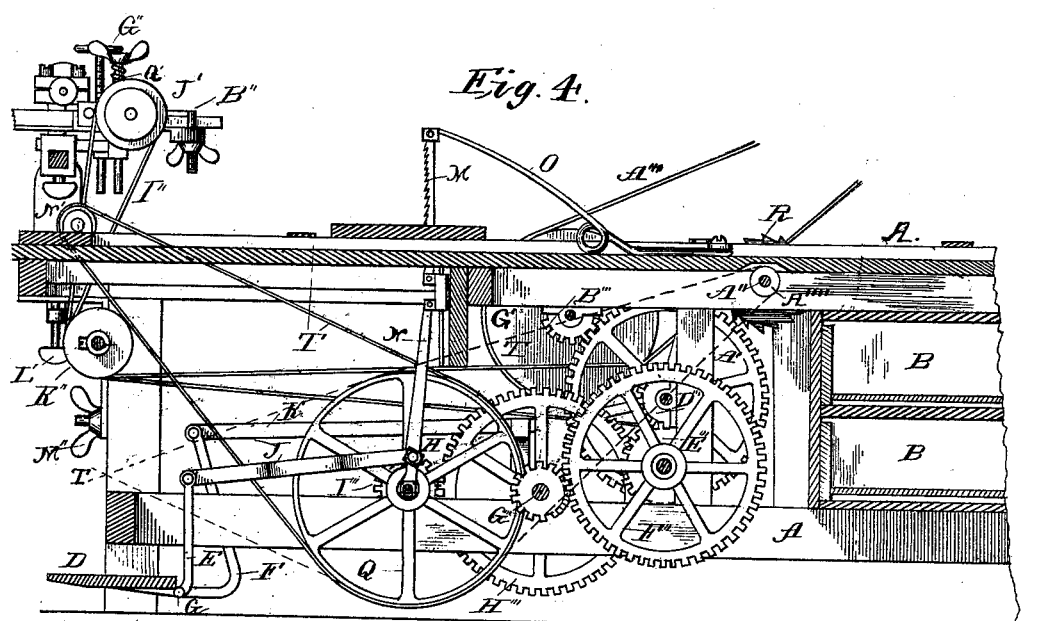
Figure 5:
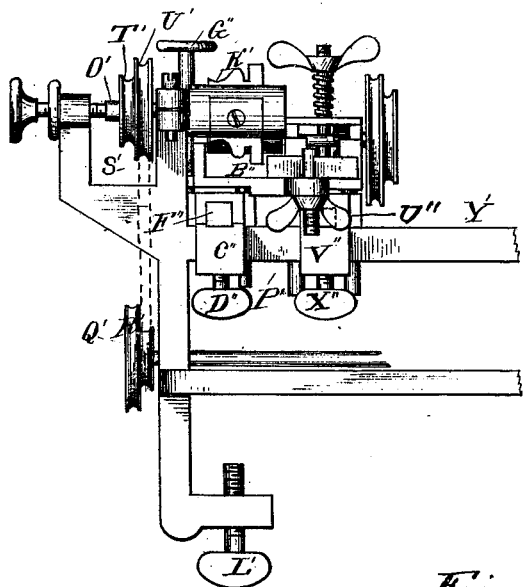
Figure 6:
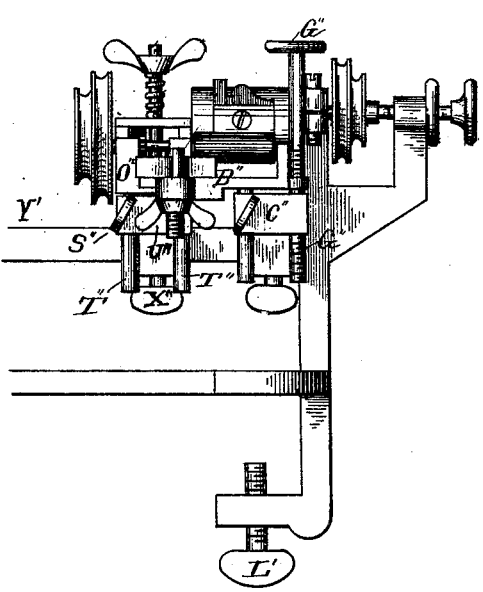
Figure 7:
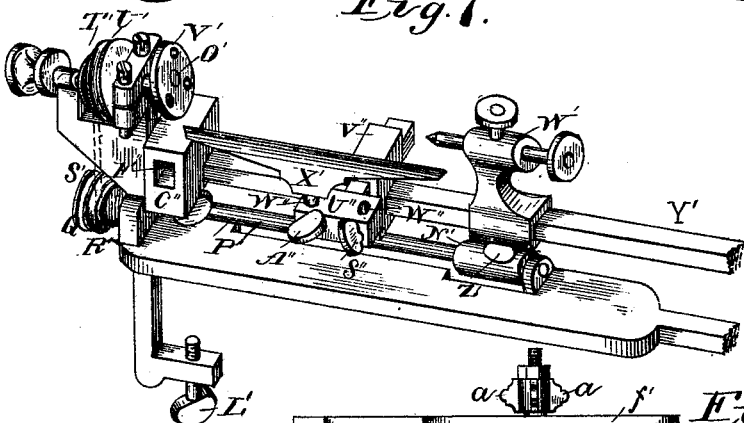
Figure 8:
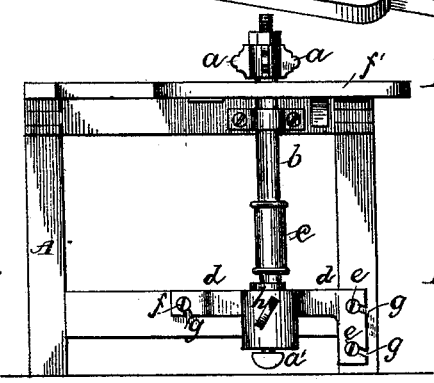
Figure 9:
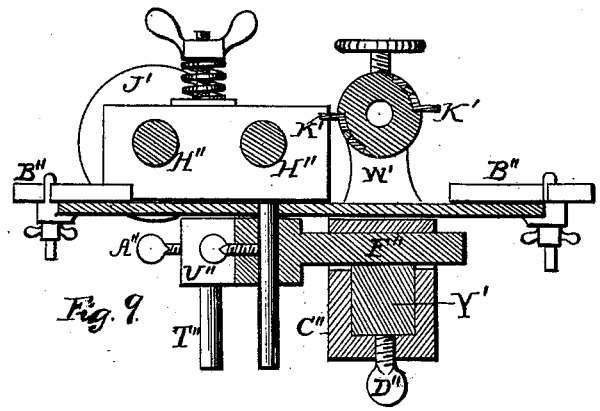
Figure 10:
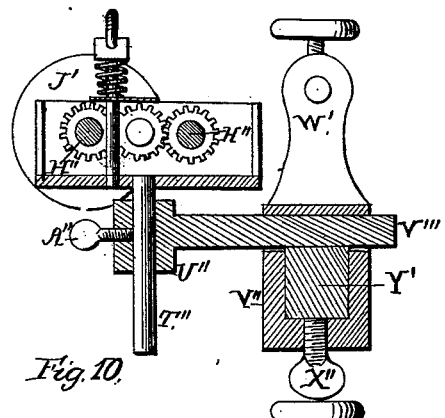
Figure 11:
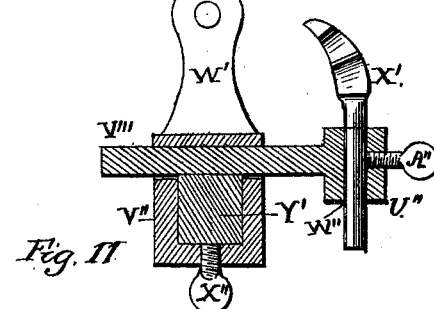

Figure 1 of the accompanying drawings represents a perspective view of my invention. Fig. 2 represents a top-plan view of the same. Fig. 3 represents an elevation of my device—of the end to which the turning-lathe is attached. Fig. 4 represents a longitudinal vertical sectional view. Fig. 5 represents a detail front view of the combined planer and turning-lathe, the latter being partly broken away, and Fig. 6 a detail rear view of same. Fig. 7 represents a detached perspective view of the turning-lathe. Fig. 8 represents a detail elevation of the shaper. Fig. 9 represents an enlarged detail view taken through the line $x\,x$ of Fig. 2. Fig. 10 represents an enlarged detail view taken through the line $y\,y$ of Fig. 2, and Fig. 11 a similar view, but showing the feed-rolls removed and the supporting-frame therefor inserted from the other side of its socket with with the tool-rest in place.

My invention relates to wood-working machinery; and it consists in the devices and combination of devices hereinafter set forth and claimed.

In the drawings, A represents a bench, to which are attached the different operative parts of my invention, and which are connected by a system of gears, pulleys, and belts, whereby a single motive power may be employed to impart motion to the different parts. A turning-lathe is attached at one end of bench A, and is made detachable by means of thumb-screws L'. This lathe consists of the usual head and tail block, the latter of which is made adjustable upon bar Y', and is provided with the set-screw Z' for this purpose. The rear ends of the bar Y' and the bed-plate of the lathe are connected by the cross-piece Y'', which is made removable and is provided with set-screws Z''.

Motion is imparted to the lathe through shaft P, which, in turn, receives motion from pulley Q by means of belt T. Shaft P is provided with double pulleys Q' R', which impart motion to shaft O', which carries the head-block by means of a belt passing over pulleys Q' R' and pulleys T' U', the latter two of which are keyed to shaft O'.

To the bar Y' of the turning-lathe are attached the sliding adjustable blocks C'' and V'', and which carry, respectively, the planer-bed and the feed-rolls of the planer. For this purpose the blocks C'' and V'' are mortised transversely to the length of bar Y' for the reception of the squared end projections F'' and V''' of the frames which carry the planer-bed and feed-rolls, by means of which the said planer-bed and feed-rolls are attached, and are secured by the thumb-screws D'' X''.

The head-block of the lathe carries the rotary cutting-knives K' of the planer.

The planer-bed B'' is raised or lowered by the screw G''.

The block U'', which carries the feed-rolls, is provided with the holes W'' W'', for the reception of the pins T'', by means of which and the set-screws A'' S'' the feed-rolls H'' are vertically adjusted.

When it is desired to use the lathe the planer-bed and feed-rolls are removed by loosening the thumb-screws D'' X''. Feed-rolls H'' are then removed from block U'', and the latter withdrawn from the mortise in the block V'' and inserted from the opposite side for the support of the tool-rest X', the supporting-pin of which enters one of the holes W'', which receive the pins T'', which support the feed-rolls. (Best seen in Figs. 7, 10, and 11.)

M is a gig-saw operated by the crank H, and is located at one side of the bench and provided with the ordinary appliances of guides and with pitman N and retracting-spring O.

R is a circular saw placed on arbor A'', at the opposite end of which is attached a boring-tool, S, working in conjunction with sliding rest U, supported by bracket W. Arbor A'' is run from belt-wheel Q, or by the application of the sliding reciprocating table Y, to the under side of which is attached rack-bar Z, which meshes with the toothed wheel A'. This wheel A' is provided with a spring-clutch of any known and suitable construction, so that when the table Y is pushed forward the series of gears and belting are put in motion by the engaging of the rack-bar with the wheel A′, thereby driving the saw, and upon the table being moved backward or retracted the clutch or ratchet attachment of the wheel A′ allows of said wheel being turned loosely upon the shaft, and thus by a continuous reciprocating motion of the table the saw R is put in motion.

a is a shaper attached to the vertical shaft b, and is put in motion by the pulley c, attached to said shaft, (see Fig. 8,) the belt-connection being from pulley Q when in use.

C is a vise, and B B are drawers located on and within the bench A. The bench A is also designed for use as an ordinary carpenter's bench.

These devices may be operated by either hand, foot, or belt power. When it is desired to apply belt power the band-pulley G′ is placed upon and keyed to the spindle I′, as shown in Figs. 2 and 4 of drawings. Upon the same shaft that carries G′ is keyed the pinion B‴, to which it imparts motion. This pinion meshes with the cog-wheel A′, to whose shaft is also attached the pinion D‴. This pinion meshes with pinion E‴, upon the shaft of which is attached the toothed wheel F″. This wheel, in turn, engages the pinion G‴, upon the shaft of which is attached the cog-wheel H‴, and which meshes with the pinion I‴, attached to the same shaft that carries pulley Q. Upon this shaft is also attached the crank H, which imparts motion to the gig-saw through the pitman N. Motion is imparted to the planer and lathe by means of the belt T running upon pulley Q. This belt may be removed and transferred to pulley A⁗, keyed to arbor A″, for driving the circular saw R and boring-tool S. Motion is imparted to the feed-rolls of the planer by means of a belt, I″, passing over the pulleys J′, K″, and D′. Power may also be applied by the treadle D, to which is attached the lever E and crank J, the latter of which is attached to the crank H, and motion thus applied to the train of gears in a manner similar to that described with reference to the belt-power applied to pulley G′.

Hand-power may also be employed to operate these devices by removing pulley G′ and substituting the crank I. This crank is connected with a train of gears, through the medium of the levers K, F, D, E, and J, to crank H. When power is not applied through lever K it is detached from crank I, and is received into the rest-support L.

Having described my invention, what I claim as new, and desire to secure by Letters Patent, is—

1. A turning-lathe the head-block of which carries the rotary knives of the planer or molder, the bar Y′, having the sliding adjustable block C″, provided with the removable planer-bed and guide B″, substantially as and for the purpose specified.

2. A turning-lathe the head-block of which carries the rotary knives of the planer or molder, the bar Y′, having the sliding adjustable blocks C″ and V″, provided with the removable planer-bed and guide B″, and removable adjustable feed-rolls, substantially as set forth.

3. A turning-lathe the head-block of which carries the rotary knives of the planer or molder, the bar Y′, having the sliding adjustable block V″, provided with the removable feed-rolls, and operating in the manner and for the purposes set forth.

4. In combination with bar Y′ and its sliding adjustable block V″, the support-piece U″, adapted to be inserted from either side of the lathe, and provided with holes W″ for the reception of the rods T″ of the feed-roll frame, or the supporting-pin of the tool-rest X′, substantially as set forth.

In testimony that I claim the foregoing as my own I affix my signature in presence of two witnesses.

F. W. GUSTAV BOETTCHER.

Witnesses:
LOUIS WEERBACH,
JAS. B. ERWIN.